(12) United States Patent
Negrini

(10) Patent No.: US 11,134,762 B2
(45) Date of Patent: Oct. 5, 2021

(54) HARD CASE FOR CONTAINING OBJECTS AND MANUFACTURING METHOD THEREOF

(71) Applicant: Negrini S.r.l., Quistello (IT)

(72) Inventor: Graziano Negrini, Quistello (IT)

(73) Assignee: Negrini S.r.l.

( * ) Notice: Subject to any disclaimer, the term of this patent is extended or adjusted under 35 U.S.C. 154(b) by 0 days.

(21) Appl. No.: 16/916,210

(22) Filed: Jun. 30, 2020

(65) Prior Publication Data
US 2020/0329836 A1 Oct. 22, 2020

Related U.S. Application Data

(62) Division of application No. 15/112,910, filed as application No. PCT/IB2015/050432 on Jan. 20, 2015, now Pat. No. 10,729,214.

(30) Foreign Application Priority Data

Jan. 21, 2014 (IT) .......................... BO2014A000020

(51) Int. Cl.
*B32B 37/00* (2006.01)
*A45C 5/02* (2006.01)
(Continued)

(52) U.S. Cl.
CPC .................. *A45C 5/02* (2013.01); *A45C 5/03* (2013.01); *A45C 13/26* (2013.01); *B29C 51/004* (2013.01);
(Continued)

(58) Field of Classification Search
USPC ........................................................ 220/4.22
See application file for complete search history.

(56) References Cited

U.S. PATENT DOCUMENTS 3,335,827 A 8/1967 Hofferbert
4,333,978 A 6/1982 Kocher
(Continued)

FOREIGN PATENT DOCUMENTS

EP 1433585 A2 6/2004
EP 1867246 A1 12/2007

*Primary Examiner* — James D Sells
(74) *Attorney, Agent, or Firm* — Laubscher & Laubscher, P.C.

(57) ABSTRACT

A hard case for housing and transporting objects includes a first shell and a second shell, hinges for connecting the shells and enabling the latter to be arranged in a closed configuration or in an open configuration, and a closing device to lock the shells in the closed configuration. The shells include respective main panels formed by thermoforming an interwoven polypropylene sheet including a plurality of superimposed layers, each layer having oriented polypropylene fibers therein, the layers being arranged to interweave the superimposed fibers, and respective side elements including respective interface edges intended to be coupled to each other in the closed configuration. The side elements are made of polypropylene by injection molding and are fixed to the main panels to carry out respective joining portions in which the injected polypropylene of the side elements and the interwoven polypropylene of the main panels are melted and joined to each other in order to form the shells in a single part and entirely made of polypropylene.

7 Claims, 5 Drawing Sheets

(51) Int. Cl.
*A45C 5/03* (2006.01)
*A45C 13/26* (2006.01)
*B29C 51/00* (2006.01)
*B29C 65/08* (2006.01)
*B29C 69/02* (2006.01)
*B65D 6/34* (2006.01)
*B65D 25/28* (2006.01)
*B29L 31/00* (2006.01)
*B29K 23/00* (2006.01)
*B29K 105/00* (2006.01)

(52) U.S. Cl.
CPC .............. *B29C 65/08* (2013.01); *B29C 69/02* (2013.01); *B65D 11/22* (2013.01); *B65D 25/28* (2013.01); *A45C 2005/037* (2013.01); *B29K 2023/12* (2013.01); *B29K 2105/256* (2013.01); *B29L 2031/7418* (2013.01)

(56) References Cited

U.S. PATENT DOCUMENTS

| | | | |
|---|---|---|---|
| 5,211,302 A | | 5/1993 | Tiramani |
| 10,729,214 B2* | | 8/2020 | Negrini .................. B29C 69/02 |
| 2009/0145710 A1 | | 6/2009 | Roncato |

* cited by examiner

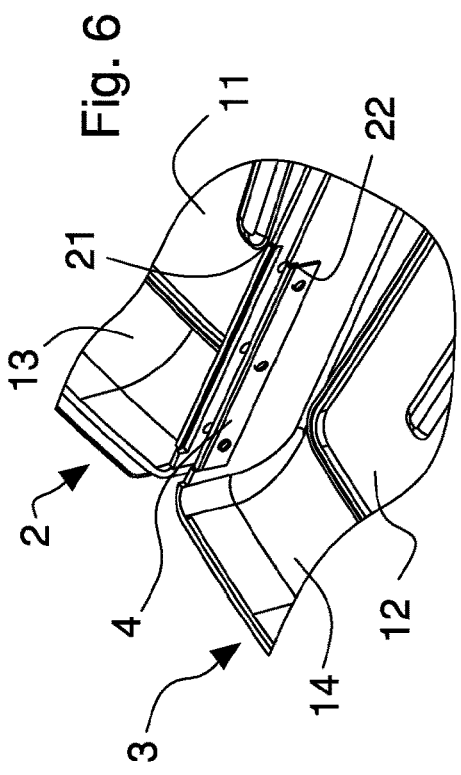
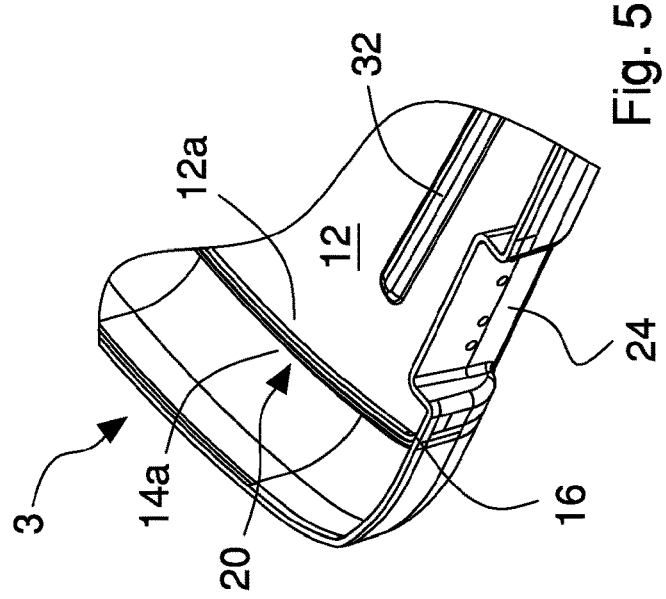
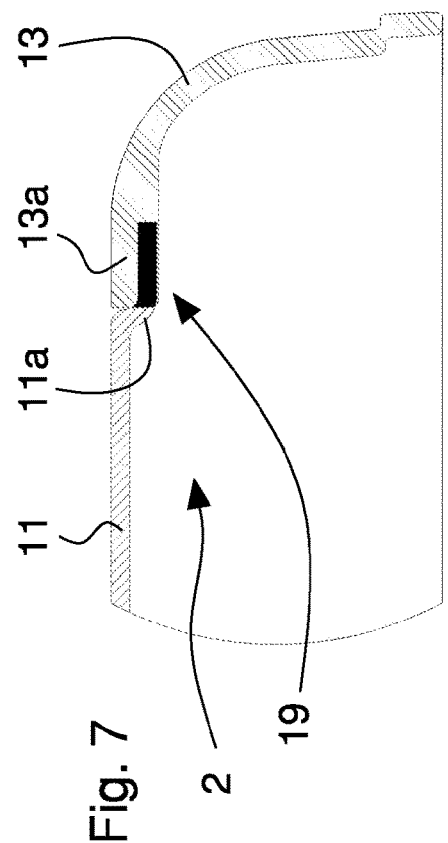
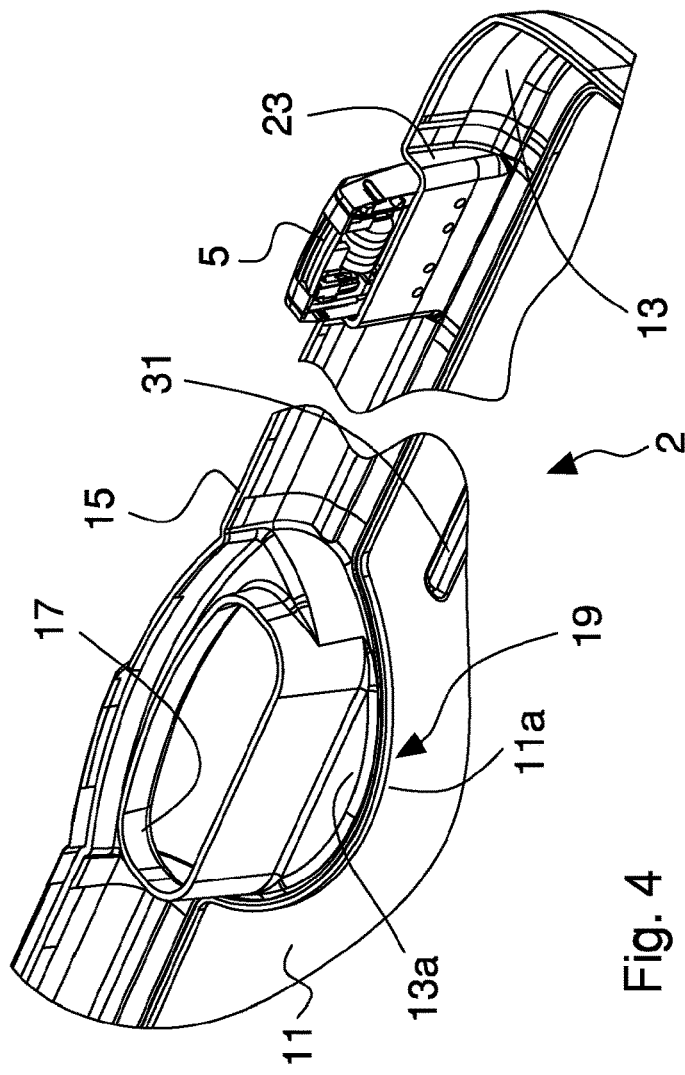

HARD CASE FOR CONTAINING OBJECTS AND MANUFACTURING METHOD THEREOF

This application is a division of U.S. patent application Ser. No. 15/112,910 filed Jul. 20, 2016. Application Ser. No. 15/112,910 is a § 371 National Stage Entry of PCT International Application No. PCT/IB2015/050432 filed Jan. 20, 2015. PCT/IB2015/050432 claims priority to IT Application No. BO2014A000020 filed Jan. 21, 2014. The entire contents of these applications are incorporated herein by reference.

BACKGROUND OF THE INVENTION

This invention relates to suitcases and/or cases made of thermoplastic material and methods for manufacturing the same. In particular the invention relates to a hard case made of polypropylene which is suitable to store and transport objects and/or products to be protected from shocks and atmospheric agents, such as instruments and technical equipment, sports equipment, weapons. The invention further relates to a method for manufacturing this case.

BRIEF DISCUSSION OF THE PRIOR ART

Suitcases and cases for storing and transporting objects and products to be protected from shocks, impacts and atmospheric agents typically include a casing made of two opposite hard shells made of thermoplastic materials, typically polypropylene (PP), acrylonitrile-butadiene-styrene (ABS), polyvinylchloride (PVC), polycarbonate (PC), which materials ensure good mechanical and chemical strength. The two hard shells are hinged to each other to allow the casing to be opened and closed and are provided with a suitable closing device to be locked in a closed configuration in which the shells are superimposed and the respective peripheral edges of the side walls are coupled to and abutted against each other. The hinges and the closing device must be suitable to ensure a strong and steady coupling of both shells in the closed configuration in order to prevent any accidental opening either due to shocks, stress or tampering attempts.

Injection molding processes are known which allow manufacturing hard shells having variously complex shapes, with good finishing and even considerable wall thicknesses.

In the cases used for transporting objects, in order to ensure suitable rigidity, robustness and mechanical strength of the shells, particularly those having large size, high wall thicknesses are required, which are greater than those commonly used in cases for clothing. For example, using the injected polypropylene, if the thicknesses of the clothing suitcases generally range between 0.8 mm and 1.2 mm, the suitcases for objects transportation have a minimum thickness of 2.5 mm to 3.5-4 mm. However, the thickness increase causes a consequent increase of the case weight, which is not desirable because the objects to be transported are heavy and a case (typically used for transport by air) should be as light as possible.

Injection molding processes allow manufacturing peripheral edges of the side walls, which enable a precise coupling in the closed configuration.

Injection molding processes, however, are complicated and expensive because of equipment and molds required to work the fused thermoplastic material at high pressures and temperatures.

Thermoforming processes are also used, which allow manufacturing case shells by hot-forming plastic sheet materials, typically ABS, PP, PC. Thermoforming is a less complicated and expensive process than injection molding because it allows using simpler and cost-effective molds and also working under lower temperatures.

After the thermoforming process, the thus-formed sheet portion is cut out to remove the scraps and obtain the shell.

Although the thermoforming process improves the mechanical characteristics of the plastic material, in any case in order to have a suitable strength and rigidity in cases of large-size, high-thickness sheets are required that are more difficult to work. Alternatively, it is possible to manufacture shells provided with double walls. In both cases, this results in an increase in the manufacturing costs and suitcase weight.

Hard cases are also known, which have shells manufactured by thermoforming thermoplastic material sheets provided with joining elements made of a flexible material, such as plastic or rubber, and fixed to the opposite peripheral edges of said shells.

Each joining element has a portion acting as a hinge and a further portion provided with a zip fastener to allow the suitcase to be opened or closed. Said joining elements do not ensure a suitable resistance to shocks, stress and atmospheric agents and further do not offer a suitable guarantee that unauthorized people cannot access the content.

SUMMARY OF THE INVENTION

An object of the present invention is to improve the known cases made of thermoplastic material and the methods for manufacturing the same, in particular hard suitcases and cases suitable to store and transport objects, such as technical instruments and equipment, sports equipment and weapons.

Another object is to carry out a case for transporting objects that is light and has high mechanical characteristics, in particular that is hard, robust and resistant to shocks, abrasion and atmospheric agents and suitable to ensure a high protection to the objects contained therein.

A further object is to manufacture a case made of sole material in order to be totally recyclable.

Another object is to provide a method that allows manufacturing a case for transporting objects which is light, strong and resistant to shocks and atmospheric agents in a fast, effective and economic manner.

The hard suitcase of the invention arranged for housing and transporting objects includes a first shell and a second shell, hinges to connect the shells and enable the latter to be arranged in a closed configuration or in an open configuration and a closing device to lock the shells in the closed configuration.

The shells include respective main panels manufactured by thermoforming an interwoven polypropylene sheet that includes a plurality of superimposed layers having oriented polypropylene fibers therein and respective side elements made of polypropylene by injection molding. The side elements are fixed to the main panels to carry out respective joining portions in which the injected polypropylene of the side elements and the interwoven polypropylene of the main panels are melted and joined to each other to form the shells in a single body, entirely made of polypropylene. The side elements further include respective interface edges, which are intended to be reciprocally coupled in the closed configuration.

In an embodiment the side elements are injection molded directly on the respective main panels so that in the joining portions the injected polypropylene of the side elements and the interwoven polypropylene of the main panels are melted and joined to each other.

The inventive method provides for manufacturing the shells forming the case according to the following steps:
manufacturing the main panels by thermoforming an interwoven polypropylene sheet that includes a plurality of superimposed layers, each layer having oriented polypropylene fibers therein, the arrangement of said layers being carried out so as to interweave the superimposed fibers;
manufacturing the side elements of polypropylene by injection molding;
fixing the side elements to the main panels at respective joining portions so that the injected polypropylene of said side elements and the interwoven polypropylene of said main panels are melted and joined to each other in order to form said shells in a single body entirely made of polypropylene.

In particular, the method provides fixing by injecting the melted polypropylene of the side elements directly to the main panels so that the injected melted polypropylene is melted and joined to the interwoven polypropylene.

The hard case of the invention is 30-35% lighter than the standard cases made of injected polypropylene, having the same mechanical performance, in particular having the same rigidity and bending strength of the shells.

Using interwoven polypropylene sheets makes it possible to carry out thermoforming main panels (that form the larger walls of the case) having a thickness considerably smaller than the thicknesses required for the main panels of cases made of injected polypropylene.

The interwoven polypropylene is a material having high mechanical characteristics, in particular provided with high bending strength and high shock resistance and having low weight due to the lower density.

Therefore the considerable weight reduction of the case makes the latter to be transported and used more comfortably and easily and to store heavier objects.

The side elements, which are made of polypropylene by injection molding, can be securely fixed and joined to the main panels without interruption so as to carry out shells in a single body, which have high rigidity and mechanical resistance to bending and shocks.

The injection molding process also allows providing shaped portions on the side elements, which are arranged for fixing hinges and closing devices and/or providing functional elements of the case.

The hard case of the invention, which is entirely made of polypropylene, is 100% recyclable.

BRIEF DESCRIPTION OF THE FIGURES

The invention will be better understood and implemented with reference to the attached drawings that illustrate some embodiments thereof by way of non-limiting example, wherein:

FIG. 4 is a partial and interrupted enlarged detail of a first shell of the case of FIG. 1 showing handle and closing devices;
FIG. 5 is another enlarged detail of the case of FIG. 1;
FIG. 6 is a further enlarged detail of the case of FIG. 1 showing hinges;
FIG. 7 is a partial cross-sectional view of the first shell of the case of FIG. 1 at a joining area between a main panel and a side element.

DETAILED DESCRIPTION

Figure 1:
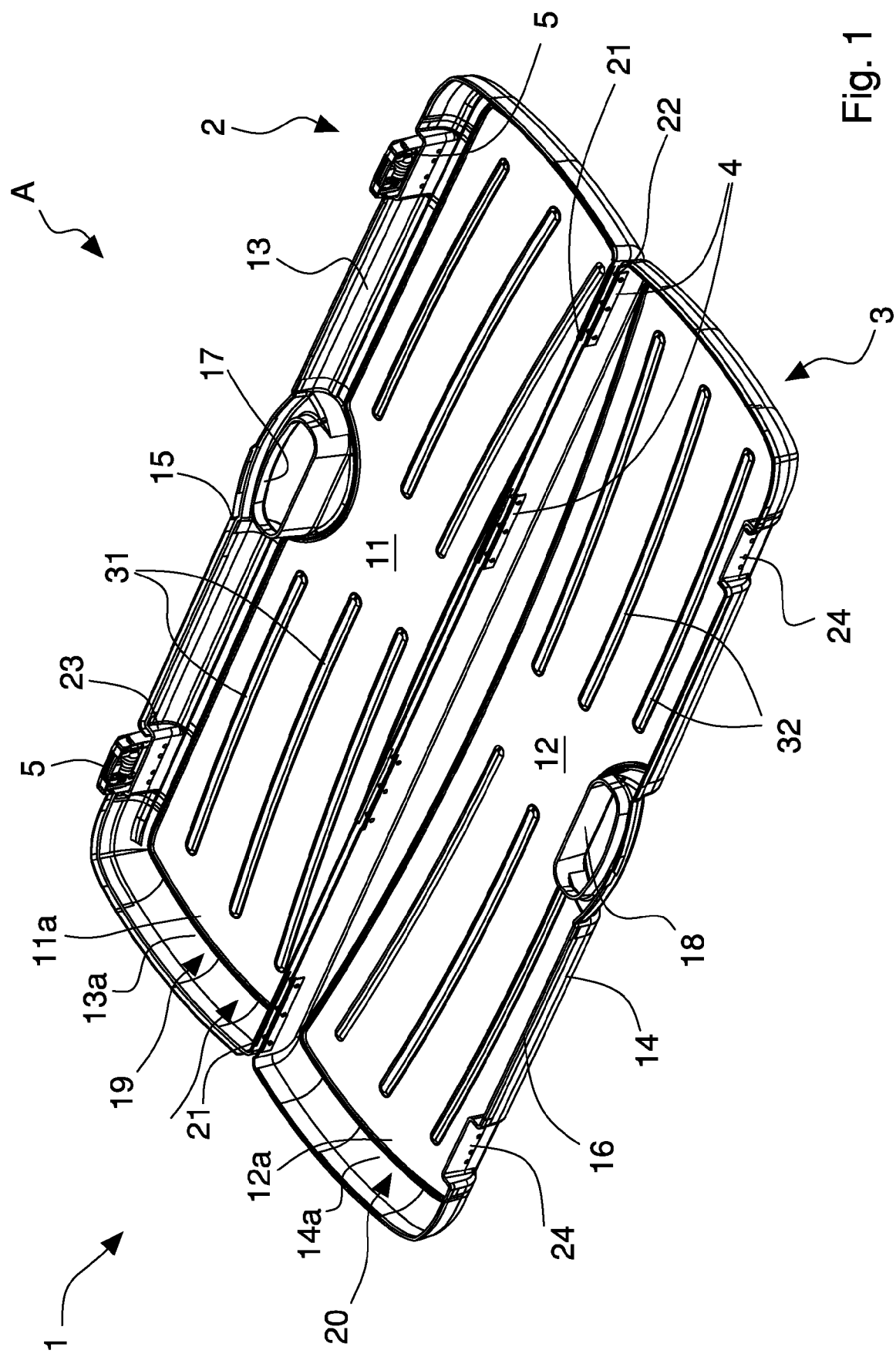
FIG. 1 is a perspective view of a case for transporting objects according to the invention in an open configuration.

With reference to FIGS. 1 to 7, a hard case 1 is illustrated according to the invention, which is suitable to house and transport objects and/or products, in particular objects to be protected from shocks and atmospheric agents, such as for example technical instruments and equipment, sports equipment, weapons.

The hard case or suitcase includes a first shell 2 and a second shell 3, hinges 4 for mutually and pivotally connecting the two shells 2, 3 so as to allow the latter to be arranged in a closed configuration C or in an open configuration A, and a closing device 5 for locking the shells 2, 3 in the closed configuration C.

The shells 2, 3 include respective main panels 11, 12 manufactured by thermoforming an interwoven polypropylene sheet, and respective side elements 13, 14 that are peripheral, manufactured by injection-molded polypropylene and fixed to the main panels 11, 12 so as to provide respective joining portions 19, 20 in which the injected polypropylene of the side elements 13, 14 and the interwoven polypropylene of the main panels 11, 12 are melted and joined to each other in order to form the shells 2, 3 in a single body, which is entirely made of polypropylene.

The main panels 11, 12 form the larger-sized main wall of the shell 2, 3, whereas the side elements 13, 14 form the four side walls or sides of the shell 2, 3 which peripherally surround the respective main panels 11, 12. The side elements 13, 14 include respective interface edges 15, 16 suitable to be mutually coupled in the closed configuration C.

The main panels 11, 12 include respective peripheral strips 11a, 12a and the side elements 13, 14 include respective further peripheral strips 13a, 14a, the peripheral strips 11a, 12a being superimposed and fixed to the respective further peripheral strips 13a, 14a.

The interwoven polypropylene sheet, also known as reinforced polypropylene, is a known material. The sheets or plates in this material include a plurality of superimposed polypropylene layers, each layer having oriented polypropylene fibers therein. The layers are arranged to interweave the superimposed fibers. Thus a material is obtained which has high mechanical characteristics; particularly, as compared with ABS and PP, the interwoven polypropylene has greater bending strength and greater shock resistance and, at the same time, a lower weight due to the low density thereof.

The interwoven polypropylene sheets can be thermoformed, but due to the mechanical characteristics thereof, they require high draft angles for the molds and do not allow obtaining products with complex shapes and/or provided with undercuts and/or portions having important orientation changes and/or small bending radiuses.

In the embodiment illustrated in FIGS. 1 to 7, the shells 2, 3 have an elongated rectangular shape with rounded corners and the side elements 13, 14 are injection molded directly on the respective main panels 11, 12 so as to provide the joining portions 19, 20, in which the injected polypropylene and the interwoven polypropylene of the main panels 11, 12 are melted and joined in order to form shells 2, 3 in a single part or body. Each joining portion 19, 20 is carried out on a peripheral strip 11a, 12a of the main panel 11, 12 and on a further peripheral strip 13a, 14a of the corresponding side element 13, 14 (FIG. 7) that is formed after the injection molding.

Figure 2:
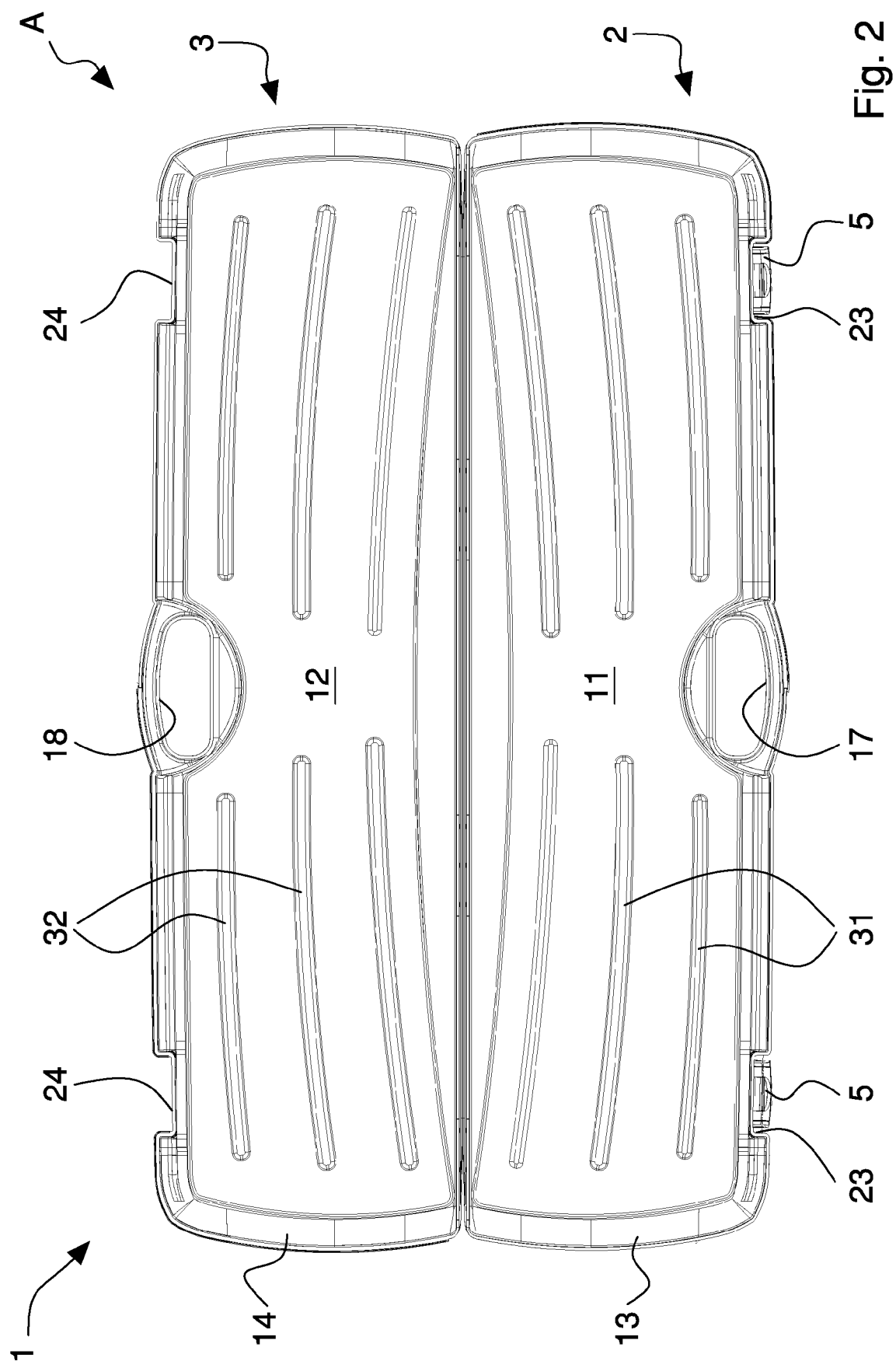
FIG. 2 is a top plan view of the case of FIG. 1.
Figure 3:
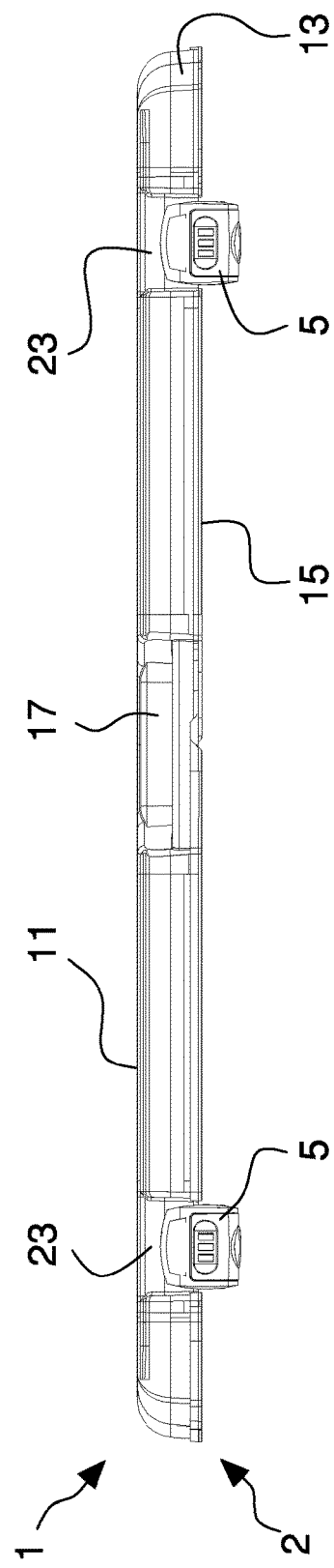
FIG. 3 is a front view of the case of FIG. 1.

With particular reference to FIGS. 1 and 2, the first shell 2 includes a first main panel 11 to which a first side element 13 is fixed at a first joining portion 19 that extends throughout the peripheral extent of the first main panel 11. The first joining portion 19 is carried out on a first peripheral strip 11a of the first main panel 11 that is superimposed on a further first peripheral strip 13a of the first side element 13.

Similarly, the second shell 3 includes a second main panel 12 to which a second side element 14 is fixed at a second joining portion 20 that extends throughout the peripheral extent of the second main panel 12. The second joining portion 20 is provided on a second peripheral strip 12a of the first main panel 11 that is superimposed on a further second peripheral strip 14a of the second side element 14.

Figure 8:
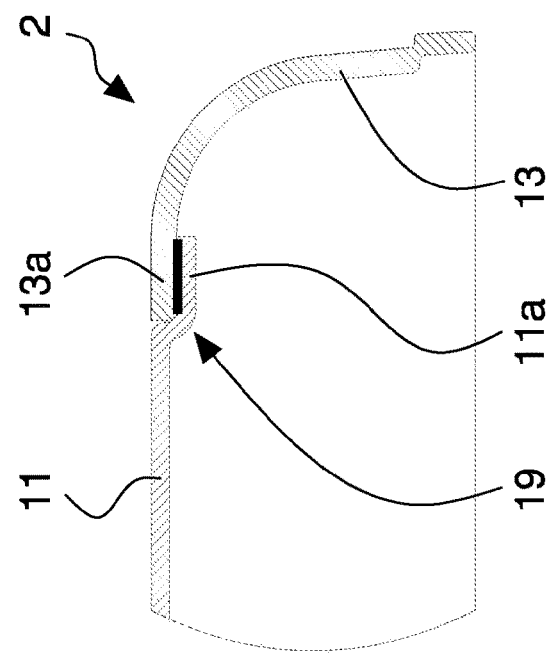
FIG. 8 is a partial cross-sectional view of a variant of the case of the invention at the joining area between the main panel and the side element of the first shell.

Alternatively, the main panels 11, 12 and the side elements 13, 14 can be separately manufactured and then fixed by ultrasonic welding. In particular, the peripheral strips 11a, 12a of the main panels are superimposed and fixed to the further peripheral strips 13a, 14a by ultrasonic welding, in order to form the joining portions 19, 20 in which the injected polypropylene of the side elements 13, 14 is merged to the interwoven polypropylene of the main panels 11, 12 so as to form a single part (FIG. 8).

The ultrasonic welding, as it is known, allows welding thermoplastic materials of the same type in a precise and effective manner. In this case, the injected polypropylene of the side elements 13, 14 and the interwoven polypropylene of the main panels 11, 12 are melted and securely joined to each other at the joining portions 19, 20 owing to the heat generated by the intense vibration at ultrasonic frequency so as to form a single part.

Side elements 13, 14, which are manufactured by injection molding, integrate and include shaped portions arranged to fix the hinges and closing device and/or to carry out functional elements of the case 1.

In particular, the side elements 13, 14 include handle portions 17, 18 arranged to form a handle for gripping and transporting the case 1 in the closed configuration C. The first side element 13 of the first shell 2 is provided with first handle portion 17 including a first opening manufactured at a front central portion of the first side element 13. The second side element 14 of the second shell 3 is provided with a second handle portion 18 including a second opening manufactured at a respective front central portion of the second side element 14. In the closed configuration C, the two openings match thus defining the gripping handle.

The side elements 13, 14 also include first shaped portions 21, 22 arranged to receive the hinges 4. More precisely, the first side element 13 of the first shell 2 includes a plurality of first shaped portions 21, for example four, that form respective seats each of which is suitable to accommodate a first side of a hinge 4 of the hinges. Similarly, the second side element 14 of the second shell 3 includes a plurality of further first shaped portions 22, for example four, that form respective seats, each of which is suitable to accommodate a second side of the hinge 4.

Second shaped portions 23, 24 are provided on the side elements 13, 14 in order to receive and be coupled to the closing device 5. In particular, in the shown embodiment herein, the first side element 13 of the first shell 2 includes one or more second shaped portions 23, for example two, that form respective seats, each of which is arranged to accommodate a corresponding closing device 5 of the closing device, in particular a combination or key lock. The second side element 14 of the second shell 3 includes, in turn, one or more further shaped portions 24, for example two, forming respective housings capable of receiving and be coupled to the corresponding locking devices 5 fixed to the first shell 2, such as to allow locking the suitcase in the closed configuration C.

The main panels 11, 12 of the shells 2, 3 can include, as in the embodiment illustrated in the figures, one or more respective stiffening ribs 31, 32 consisting of linear grooves carried out on an outer wall of the main panels 11, 12 by deforming the polypropylene sheet during the thermoforming process. The stiffening ribs provide the main panels 11, 12 with further rigidity and lower shock deformability.

Figure 9:
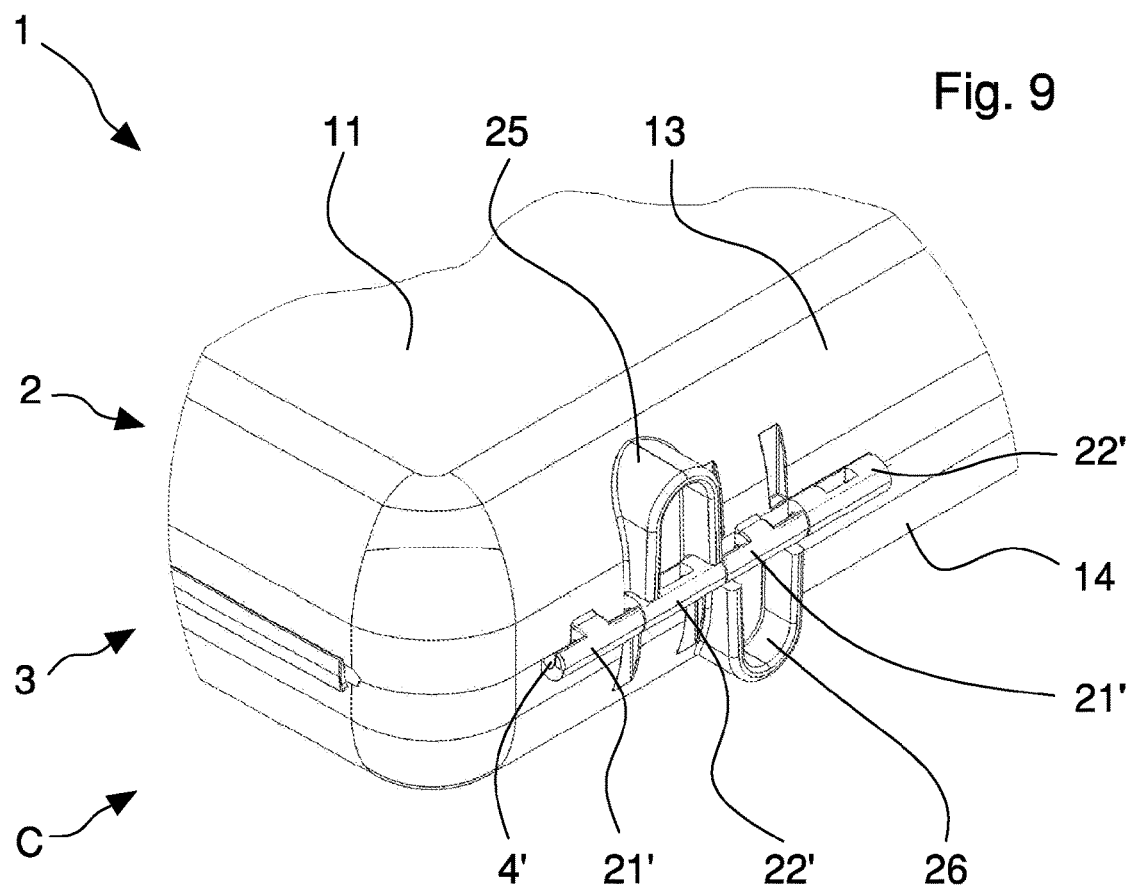
FIG. 9 is a partial perspective view of another variant of the case of the invention in a closed configuration detailing hinges and supports.
Figure 10:
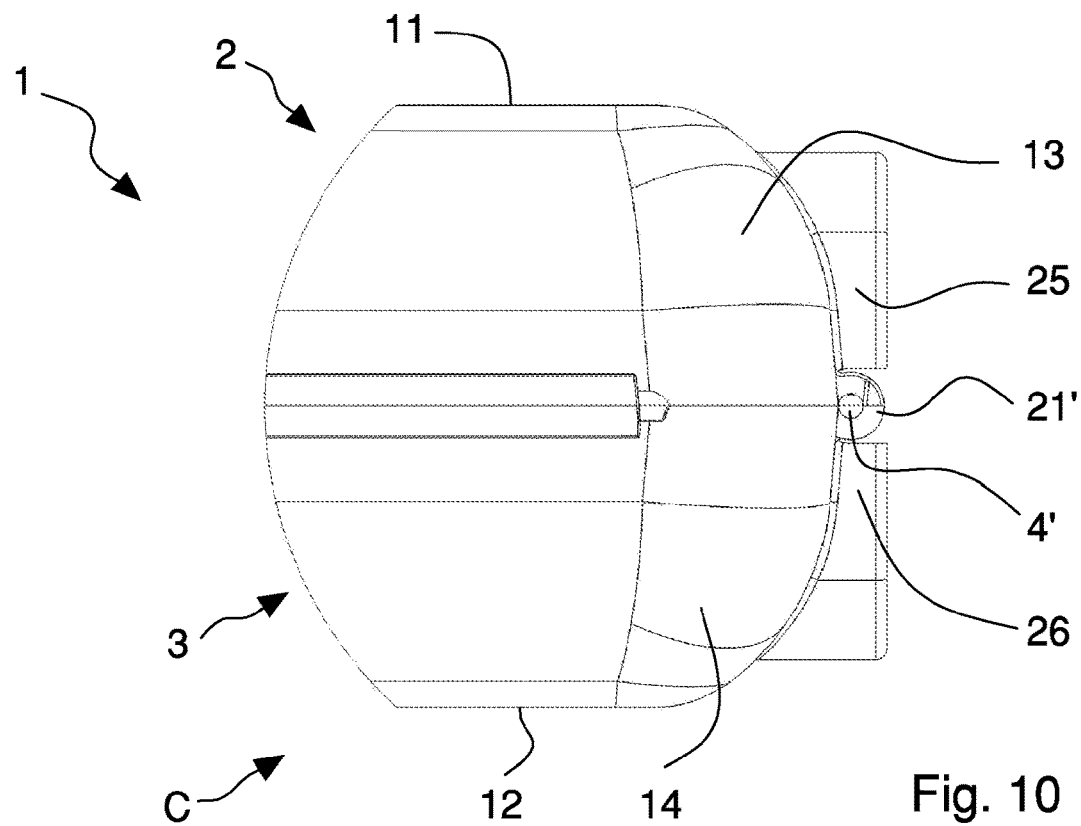
FIG. 10 is a partial side view of the suitcase of FIG. 9.

FIGS. 9 and 10 illustrate a variant of the case 1 of the invention which differs from the above described embodiment in the different configuration of the first shaped portions 21', 22' which are arranged to receive the hinges 4'. In this version, the shaped portions 21', 22' include respective projecting lugs arranged to receive a rotation pin of the hinges 4'.

The shown variant of the case 1 also differs in the side elements 13, 14 that include third shaped portions 25, 26 suitable to form supports of the case 1 in the closed configuration C. More precisely, the first side element 13 includes at least one couple of projecting third shaped portions 25 that form respective supporting feet and the second side element 14 includes at least one couple of further projecting third shaped portions 26 that form respective further supporting feet.

The method according to the invention for manufacturing the above described hard case 1, which is arranged for housing and transporting objects and includes the first shell 2 and second shell 3 mutually connected by hinges 4, provides for the manufacture of said shells 2, 3, formed by the respective main panels 11, 12, defining the larger-sized walls, and by the respective side elements 13, 14 provided with interface edges 15, 16 intended to be mutually coupled in the closed configuration of the suitcase 1.

The method provides to manufacture the shells 2, 3 according to the following steps:
making the main panels 11, 12 by thermoforming an interwoven polypropylene sheet including a plurality of superimposed layers, each layer having oriented polypropylene fibers therein, the arrangement of said layers being carried out so as to interweave the superimposed fibers;
making the side elements 13, 14 of polypropylene by injection molding;
fixing the side elements 13, 14 to the main panels 11, 12 at respective joining portions 19, 20 so that the injected polypropylene of the side elements 13, 14 and the interwoven polypropylene of the main panels 11, 12 are melted and joined in order to form the shells 2, 3 in a single part and entirely made of polypropylene.

The method provides fixing the side elements 13, 14 to the main panels 11, 12 by injecting the melted polypropylene of the side elements 13, 14 directly on the main panels 11, 12 so that in said joining portions 19, 20 the injected polypropylene and the interwoven polypropylene are melted and joined in order to form a single part. In particular, the side elements 13, 14 are joined to the respective main panels 11, 12 without interruptions in order to form hard shells 2, 3 in a single monolithic part or body, thereby ensuring high rigidity and resistance to mechanical bending and shock.

More precisely, the melted polypropylene is injected in such way to contact, melt and join to the interwoven polypropylene of a peripheral strip 11a, 12a of the main panel 11, 12. Thereby, once the polypropylene solidifies, joining portions 19, 20 are obtained on the peripheral strips 11a, 12a of the main panels 11, 12 and on the further peripheral strips 13a, 14a of the corresponding side elements 13, 14. The peripheral strips 11a, 12a and the further peripheral strips 13a, 14a are superimposed over each other.

The method provides fixing the peripheral strips 11a, 12a of the main panels 11, 12 to the further peripheral strips 13a, 14a of the side elements 13, 14.

In making the main panels 11, 12 the method provides cutting the interwoven polypropylene sheet after thermoforming the latter in order to obtain the main panels 11, 12 provided with peripheral strips 11a, 12a.

It should be noted that even if edges or contours are generated during the cutting or shearing of the interwoven polypropylene sheet, which are not perfectly clean or neat due to the presence of residues of polypropylene fibers inside the layers, these edges (the edges of the peripheral strips 11a, 12a) are contained within the shells 2, 3 (i.e. within the case 1) and thus are not visible from outside, and furthermore they are joined by fusion to the further peripheral strips of the side elements 13, 14 so as to form the joining portions 19, 20.

In a variant of the method, the side elements 13, 14 are fixed to the main panels 11, 12 by ultrasonic welding.

The peripheral strips 11a, 12a of the main panels 11, 12 are superimposed and welded to the respective further peripheral strips 13a, 14a of the side elements 13, 14 in order to form the joining portions 19, 20 in which the injected polypropylene and the interwoven polypropylene are joined to form a single part. In particular, the injected polypropylene of the side elements 13, 14 and the interwoven polypropylene of the main panels 11, 12 are locally melted and securely joined at the joining portions 19, 20, owing to the heat generated by the intense vibration at ultrasonic frequency. Thereby, by this joining method as well, a hard shell 2, 3 is made in a single monolithic bloc in which the side elements 13, 14 are joined to the respective main panels 11, 12 without interruptions.

The hard case 1 of the invention is 30-35% lighter than standard cases made of injected polypropylene, with the mechanical performance being equal, in particular with equal rigidity and bending strength of the shells. By using interwoven polypropylene sheets it is possible to make by thermoforming main panels (which form the larger-sized walls of the case) having a thickness ranging between 2 mm and 3 mm, in particular ranging between 2.5 mm and 2.8 mm, unlike the higher thicknesses equal to 3.5 mm-4 mm required for the main panels of cases made of injected polypropylene.

With superimposed polypropylene layers which are internally provided with oriented fibers and are superimposed so that the oriented fibers are interwoven, the interwoven polypropylene is a material having high mechanical characteristics, in particular provided with high bending strength and shock resistance and a low weight resulting from the lower density thereof. This considerably low weight of the case 1 according to the invention allows a more comfortable and easy use of the latter as well as housing heavier objects therein.

It should be noted that, as the shape of the main panels 11, 12 of the shells 2, 3 is substantially flat, without undercuts and portions with significant changes in orientation and/or with narrow bending radiuses, interwoven polypropylene sheets can be easily and effectively thermoformed, having the required thicknesses (2-3 mm) that provide the case shells with high robustness and strength.

The rigidity of the shells and in particular its reduced deformability owing to shocks and impacts can be further increased by providing the main panels 11, 12 with stiffening ribs 32, 32, which can be easily and rapidly made during the thermoforming process of the interwoven polypropylene sheets.

The side elements 13, 14 made of polypropylene by injection molding can be securely joined without interruptions to the main panels 11, 12 to make shells 2, 3 in a single part, having high rigidity and mechanical properties of bending strength and shock resistance.

The injection molding process also allows making on the side elements 13, 14 shaped portions arranged to fix the hinges and the closing device and/or to make functional elements of the case 1.

In particular, the side elements 13, 14 form a gripping handle of the case, shaped portions 21, 22, 23, 24 for fixing the hinges 4 and the closing device 5 and further shaped portions 25, 26 suitable to form supports of the case 1 in the closed configuration.

Interface edges 15, 16 can be also made in the side elements 13, 14, which can be mutually coupled in the closed configuration C in a precise and effective manner in order to ensure a complete and stable closure of the case 1.

It should be noted, finally, that the hard case 1 of the invention is entirely made of polypropylene, a thermoplastic material that, as known, is 100% recyclable. The hinges 4 and the closing device 5 can be easily disassembled and separately disposed.

The invention claimed is:

1. A case for housing and transporting objects, comprising a first shell and a second shell, hinges for connecting said shells and enabling said shells to be arranged in a closed configuration or an open configuration, and a closing device to lock said shells in said closed configuration, wherein said shells include respective main panels made by thermoforming an interwoven polypropylene sheet that includes a plurality of superimposed layers, each layer having oriented polypropylene fibers therein, said layers being arranged to interweave the superimposed fibers, and respective side elements including respective interface edges for coupling to each other in said closed configuration, said side elements being made of polypropylene by injection molding and fixed to said main panels to carry out respective joining portions in which the injected polypropylene of the side elements and the interwoven/reinforced polypropylene of the main panels are melted and joined to each other in order to form said shells in a single body entirely made of polypropylene.

2. The case according to claim 1, wherein said side elements are injection molded directly on the respective main panels so that in said joining portions the injected polypropylene of the side elements and the interwoven polypropylene of the main panels are melted and joined to each other.

3. The case according to claim 2, wherein each joining portion is carried out on a peripheral strip of the main panel and on a further peripheral strip of the corresponding side element.

4. The case according to claim 1, wherein said main panels include respective peripheral strips and said side elements include respective further peripheral strips, said peripheral strips and said further peripheral strips being superimposed and fixed by ultrasound welding to form respective joining portions in which the injected polypropylene of the side elements and the interwoven polypropylene of the main panels are melted and joined to each other.

5. The case according to claim 1, wherein said side elements include a handle portion arranged to form in said closed configuration a handle for gripping and transporting said case.

6. The case according to claim 1, wherein said side elements include shaped portions to receive at least one of said hinges and said closing device to form supports of said case in said closed configuration.

7. The case according to claim 1, wherein said main panels include at least one respective stiffening rib.

* * * * *